(12) United States Patent
Phillips

(10) Patent No.: US 8,257,219 B2
(45) Date of Patent: Sep. 4, 2012

(54) MULTI-SPEED TRANSMISSION HAVING THREE PLANETARY GEAR SETS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 22 days.

(21) Appl. No.: 12/820,187

(22) Filed: Jun. 22, 2010

(65) Prior Publication Data

US 2011/0015028 A1      Jan. 20, 2011

Related U.S. Application Data

(60) Provisional application No. 61/226,269, filed on Jul. 16, 2009.

(51) Int. Cl.
*F16H 3/44* (2006.01)
*F16H 3/62* (2006.01)

(52) U.S. Cl. .......................... 475/284; 475/275

(58) Field of Classification Search .................. 475/269, 475/275, 284, 296, 330
See application file for complete search history.

(56) References Cited

U.S. PATENT DOCUMENTS

| | | | | |
|---|---|---|---|---|
| 6,422,969 B1 * | 7/2002 | Raghavan et al. | ............ | 475/276 |
| 6,514,170 B1 * | 2/2003 | Kao et al. | ....................... | 475/296 |
| 6,595,892 B2 * | 7/2003 | Raghavan et al. | ............ | 475/296 |
| 6,623,398 B2 * | 9/2003 | Raghavan et al. | ............ | 475/296 |
| 6,626,789 B2 * | 9/2003 | Raghavan et al. | ............ | 475/275 |
| 6,648,791 B2 * | 11/2003 | Kao et al. | ........................ | 475/296 |
| 6,652,411 B2 * | 11/2003 | Raghavan et al. | ............ | 475/296 |
| 6,656,078 B1 * | 12/2003 | Raghavan et al. | ............ | 475/276 |
| 6,679,803 B1 * | 1/2004 | Raghavan et al. | ............ | 475/276 |
| 6,705,967 B2 * | 3/2004 | Raghavan et al. | ............ | 475/275 |
| 6,705,968 B2 | 3/2004 | Raghavan et al. | | |
| 6,705,969 B2 * | 3/2004 | Bucknor et al. | ............... | 475/290 |
| 6,709,358 B2 * | 3/2004 | Raghavan et al. | ............ | 475/275 |
| 6,709,359 B2 * | 3/2004 | Usoro et al. | ................... | 475/276 |
| 6,709,360 B2 * | 3/2004 | Raghavan et al. | ............ | 475/280 |
| 6,716,131 B1 * | 4/2004 | Usoro et al. | ................... | 475/276 |
| 6,736,752 B2 * | 5/2004 | Usoro et al. | ................... | 475/296 |
| 6,780,138 B2 * | 8/2004 | Raghavan et al. | ............ | 475/276 |
| 6,932,735 B2 * | 8/2005 | Kao et al. | ........................ | 475/276 |
| 6,976,932 B2 * | 12/2005 | Raghavan et al. | ............ | 475/296 |
| 7,192,377 B2 * | 3/2007 | Shim | ............................. | 475/269 |
| 7,507,179 B2 * | 3/2009 | Gumpoltsberger | ............ | 475/285 |
| 7,566,284 B2 * | 7/2009 | Gumpoltsberger | ............ | 475/276 |
| 7,591,753 B2 * | 9/2009 | Gumpoltsberger | ............ | 475/284 |
| 7,833,123 B2 * | 11/2010 | Hiramatsu | ..................... | 475/276 |
| 7,914,415 B2 * | 3/2011 | Hiramatsu | ..................... | 475/323 |
| 8,007,399 B2 * | 8/2011 | Hiramatsu | ..................... | 475/286 |
| 2002/0183160 A1 * | 12/2002 | Kao et al. | ........................ | 475/269 |
| 2007/0202984 A1 * | 8/2007 | Gumpoltsberger | ............ | 475/323 |
| 2007/0238574 A1 * | 10/2007 | Gumpoltsberger | ............ | 475/284 |
| 2008/0051246 A1 * | 2/2008 | Gumpoltsberger | ............ | 475/276 |
| 2009/0143185 A1 * | 6/2009 | Hiramatsu | ..................... | 475/275 |
| 2009/0143187 A1 * | 6/2009 | Hiramatsu | ..................... | 475/282 |
| 2010/0311536 A1 * | 12/2010 | Aota et al. | ..................... | 475/275 |

* cited by examiner

*Primary Examiner* — David D Le
*Assistant Examiner* — Michael Gonzalez

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

12 Claims, 2 Drawing Sheets

| GEAR STATE | GEAR RATIO | RATIO STEP | TORQUE TRANSMITTING ELEMENTS ||||| 
|---|---|---|---|---|---|---|---|
| | | | 32 | 26 | 30 | 34 | 28 |
| Rev | -4.539 | | X | G | | | |
| N | | -0.90 | O | | | | |
| 1st | 5.051 | | X | | G | | |
| 2nd | 3.320 | 1.52 | X | | | X | |
| 3rd | 2.148 | 1.55 | | | X | X | |
| 4th | 1.528 | 1.41 | | X | | X | |
| 5th | 1.260 | 1.21 | | | | X | X |
| 6th | 1.000 | 1.26 | | | X | | X |

X = ON - ENGAGED CARRYING TORQUE
O = ON - ENGAGED NOT CARRYING TORQUE
G = ON - GARAGE SHIFT ELEMENT ON AND CARRYING TORQUE

*Fig-3*

MULTI-SPEED TRANSMISSION HAVING THREE PLANETARY GEAR SETS

CROSS-REFERENCE TO RELATED APPLICATIONS

This application claims priority to U.S. Provisional Application No. 61/226,269, filed on Jul. 16, 2009, which is hereby incorporated in its entirety herein by reference.

FIELD

The invention relates generally to a multiple speed transmission having a plurality of planetary gear sets and a plurality of torque transmitting devices and more particularly to a transmission having six or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

In an embodiment of the present invention, the first, second, and third planetary gear sets each having sun gear, carrier and ring gear members.

In another embodiment of the present invention, the input member is continuously interconnected to the sun gear of the third planetary gear set.

In another embodiment of the present invention, the output member is continuously interconnected to the carrier member of the third planetary gear set.

In an embodiment of the present invention, a first interconnecting member continuously interconnects the sun gear of the first planetary gear set with the sun gear of the second planetary gear set.

In an embodiment of the present invention, a second interconnecting member continuously interconnects the carrier member of the first planetary gear set with the ring gear of the second planetary gear set.

In an embodiment of the present invention, a third interconnecting member continuously interconnects the carrier member of the second planetary gear set with the ring gear of the third planetary gear set.

In an embodiment of the present invention, a first torque transmitting mechanism is selectively engageable to interconnect the sun gear of the third planetary gear set and the input member with the ring gear of the first planetary gear set.

In an embodiment of the present invention, a second torque transmitting mechanism is selectively engageable to interconnect the carrier member of the first planetary gear set and the ring gear of the second planetary gear set with the sun gear of the third planetary gear set and the input member.

In an embodiment of the present invention, a third torque transmitting mechanism is selectively engageable to interconnect the ring gear of the first planetary gear set with the carrier member of the third planetary gear set and the output member.

In an embodiment of the present invention, a fourth torque transmitting mechanism is selectively engageable to interconnect the carrier member of the first planetary gear set and the ring gear of the second planetary gear set with the stationary member.

In an embodiment of the present invention, a fifth torque transmitting mechanism is selectively engageable to interconnect the sun gear of the first planetary gear set and the sun gear of the second planetary gear set with the stationary member.

In an embodiment of the present invention, the torque transmitting mechanisms are selectively engageable in combinations of at least two to establish at least six forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that the embodiments of the six speed automatic transmission of the present invention have an arrangement of permanent mechanical connections between the elements of the three planetary gear sets. A first component or element of a first planetary gear set is permanently coupled to a second component or element of the second planetary gear set. A second component or element of the first planetary gear set is permanently coupled to a third component or element of the third planetary gear set. A third component or element of the second planetary gear set is permanently coupled to a second component or element of the third planetary gear set.

Figure 1:
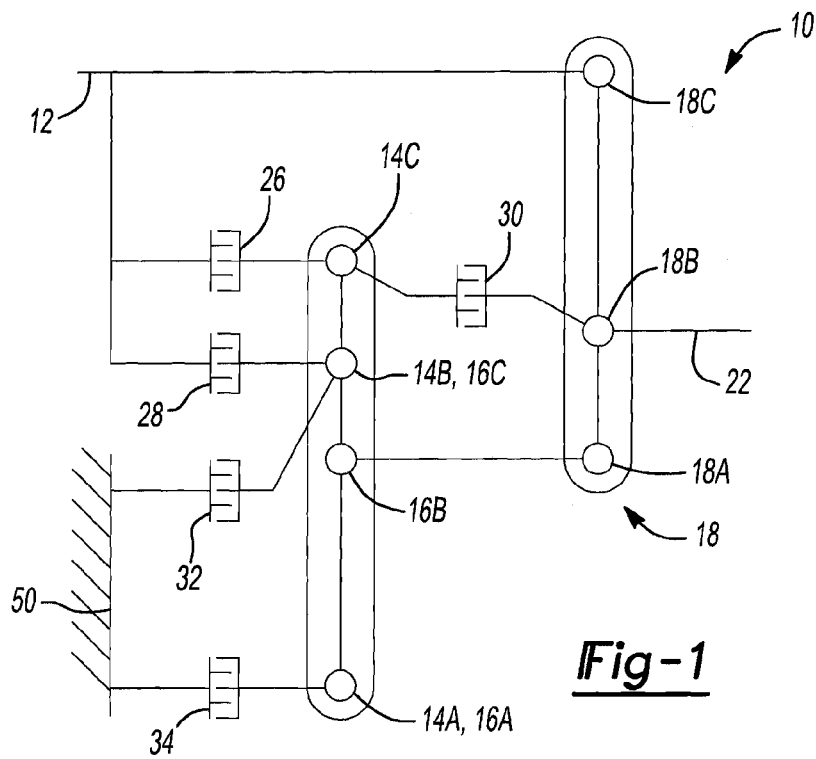
FIG. 1 is a lever diagram of an embodiment of a six speed transmission according to the present invention.

Referring now to FIG. 1, an embodiment of a six speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16 and a third planetary gear set 18 and an output shaft or member 22. In the lever diagram of FIG. 1, the levers for the first planetary gear set 14 and the second planetary gear set 16 have been combined into a single four node lever 14,16 having: a first node 14A, 16A, a second node 16B, a third node 14B, 16C and a fourth node 14C. The third planetary gear set 18 has three nodes: a first node 18A, a second node 18B and a third node 18C.

The input member 12 is continuously coupled to the third node 18C of the third planetary gear set 18. The output member 22 is coupled to the second node 18B of the third planetary gear set 18. The first node 14A of the first planetary gear set 14 is coupled to the first node 16A of the second planetary gear set 16. The second node 14B of the first planetary gear set 14 is coupled to the third node 16C of the second planetary gear set 16. The second node 16B of the second planetary gear set 16 is coupled to the first node 18A of the third planetary gear set 18.

A first clutch 26 selectively connects the third node 14C of the first planetary gear set 14 with the third node 18C of the third planetary gear set 18 and the input member or shaft 12. A second clutch 28 selectively connects the second node 14B of the first planetary gear set 14 and the third node 16C of the second planetary gear set 16 with the input member or shaft 12 the third node 18C of the third planetary gear set 18. A third clutch 30 selectively connects the third node 14C of the first planetary gear set 14 with the second node 18B of the third planetary gear set 18 and the output member or shaft 22. A first brake 32 selectively connects the second node 14B of the first planetary gear set 14 and the third node 16C of the second planetary gear set 16 with a stationary member or transmission housing 50. A second brake 34 selectively connects the first node 14A of the first planetary gear set 14 and the first node 16A of the second planetary gear set 16 with a stationary member or transmission housing 50.

Figure 2:
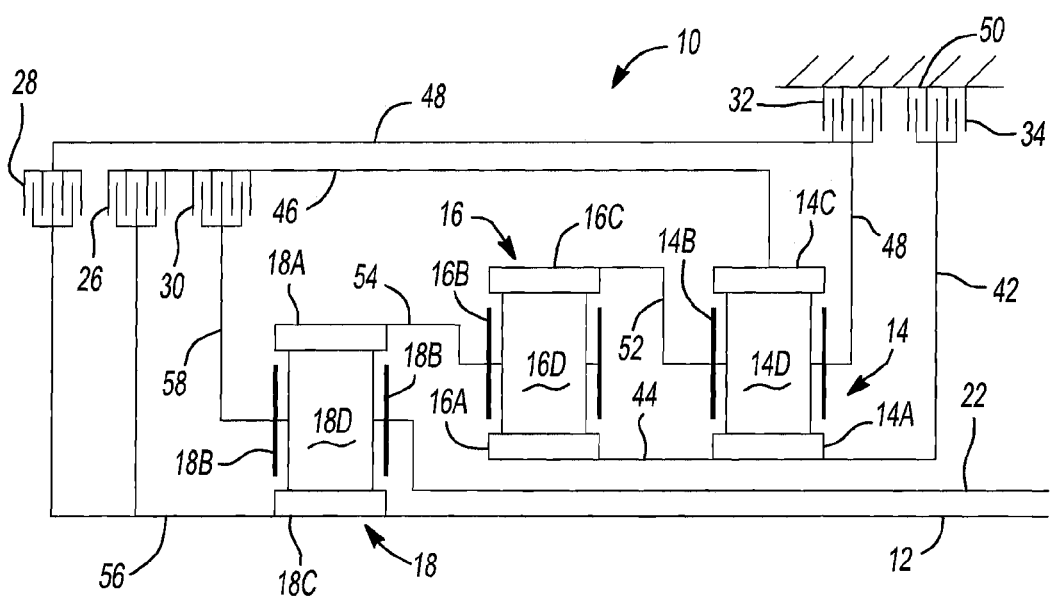
FIG. 2 is a diagrammatic illustration of an embodiment of a six speed transmission according to the present invention.

Referring now to FIG. 2, a stick diagram presents a schematic layout of the embodiment of the six speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42 and a second shaft or interconnecting member 44. The ring gear member 14C is connected for common rotation with a third shaft or interconnecting member 46. The planet carrier member 14B is connected for common rotation with a fourth shaft or interconnecting member 48 and a fifth shaft or interconnecting member 52. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the second shaft or interconnecting member 44. The ring gear member 16C is connected for common rotation with the fifth shaft or interconnecting member 52. The planet carrier member 16B is connected for common rotation with a sixth shaft or interconnecting member 54. The planet gears 16D are each configured to intermesh with both the sun gear member 16A and the ring gear member 16C.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with a seventh shaft or interconnecting member 56 and with the input member or shaft 12. The ring gear member 18A is connected for common rotation with the sixth shaft or interconnecting member 54. The planet carrier member 18B is connected for common rotation with an eighth shaft or interconnecting member 58 and with output member or shaft 22. The planet gears 18D are each configured to intermesh with both the sun gear member 18C and the ring gear member 18A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30 and brakes 32 and 34 allow for selective interconnection of the shafts or interconnecting members, members of the planetary gear sets and the housing. For example, the first clutch 26 is selectively engageable to connect the third shaft or interconnecting member 46 with the seventh shaft or interconnecting member 56. The second clutch 28 is selectively engageable to connect the fourth shaft or interconnecting member 48 with the seventh shaft or interconnecting member 56. The third clutch 30 is selectively engageable to connect the third shaft or interconnecting member 46 with the eighth shaft or interconnecting member 58. The first brake 32 is selectively engageable to connect the fourth shaft or interconnecting member 48 with the stationary element or the transmission housing 50 in order to restrict the member 48 from rotating relative to the transmission housing 50. The second brake 34 is selectively engageable to connect the first shaft or interconnecting member 42 with the stationary element or the transmission housing 50 in order to restrict the member 42 from rotating relative to the transmission housing 50.

Referring now to FIG. 2 and FIG. 3, the operation of the embodiment of the six speed transmission 10 will be described. It will be appreciated that transmission 10 is capable of transmitting torque from the input shaft or member 12 to the output shaft or member 22 in at least six forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32 and second brake 34), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carry torque when the transmission mode selector or shifter (Park, Reverse, Neutral, Drive or Low gear selector) is moved from reverse to drive and switch off when shifting back to reverse or vice versa. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, first clutch 26 and first brake 32 are engaged or activated. The first clutch 26 connects the third shaft or interconnecting member 46 with the seventh shaft or interconnecting member 56. The first brake 32 connects the fourth shaft or interconnecting member 48 with the stationary element or the transmission housing 50 in order to restrict the member 48 from rotating relative to the transmission housing 50. Likewise, the six forward ratios are achieved through different combinations of clutch and brake engagement, as shown in FIG. 3.

It will be appreciated that the foregoing explanation of operation and gear states of the six speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
    an input member;
    an output member;
    first, second and third planetary gear sets each having first, second and third members, and wherein the output member is continuously interconnected to the second member of the third planetary gear set;
    a first interconnecting member continuously interconnecting the first member of the first planetary gear set directly to the first member of the second planetary gear set;
    a second interconnecting member continuously interconnecting the second member of the first planetary gear set directly to the third member of the second planetary gear set;
    a third interconnecting member continuously interconnecting the second member of the second planetary gear set directly to the first member of the third planetary gear set; and
    five torque transmitting mechanisms each selectively engageable to interconnect at least one of the first, second and third members of the first, second and third planetary gear sets with at least one other of the first, second, third members and a stationary member, and
    wherein the torque transmitting mechanisms are selectively engageable in combinations of at least two to establish at least six forward speed ratios and at least one reverse speed ratio between the input member and the output member.

2. The transmission of claim 1 wherein a first of the five torque transmitting mechanisms is selectively engageable to interconnect the third member of the third planetary gear set and the input member with the third member of the first planetary gear set.

3. The transmission of claim 2 wherein a second of the five torque transmitting mechanisms is selectively engageable to interconnect the second member of the first planetary gear set and the third member of the second planetary gear set with the third member of the third planetary gear set and the input member.

4. The transmission of claim 3 wherein a third of the five torque transmitting mechanisms is selectively engageable to interconnect the third member of the first planetary gear set with the second member of the third planetary gear set and the output member.

5. The transmission of claim 4 wherein a fourth of the five torque transmitting mechanisms is selectively engageable to interconnect the second member of the first planetary gear set and the third member of the second planetary gear set with the stationary member.

6. The transmission of claim 5 wherein a fifth of the five torque transmitting mechanisms is selectively engageable to interconnect the first member of the first planetary gear set and the first member of the second planetary gear set with the stationary member.

7. The transmission of claim 1 wherein the first member of the first planetary gear set, the first member of the second planetary gear set and the third member of the third planetary gear set are sun gears, the second members of the first, second and third planetary gear sets are carrier members and the third member of the first planetary gear set, the third member of the second planetary gear set and the first member of the third planetary gear set are ring gears.

8. The transmission of claim 1 wherein two of the torque transmitting mechanisms are brakes for connecting a plurality of the first, second, and third members to the stationary member and three of the torque transmitting mechanisms are clutches for connecting at least one of the first, second, and third members of the first, second and third planetary gear sets to at least one other first, second and third members.

9. The transmission of claim 1 wherein the input member is continuously interconnected to the third member of the third planetary gear set.

10. A transmission comprising:
    an input member;
    an output member;
    first, second and third planetary gear sets each having first, second and third members, wherein the input member is continuously interconnected to the third member of the third planetary gear set and the output member is continuously interconnected to the second member of the third planetary gear set;

a first interconnecting member continuously interconnecting the first member of the first planetary gear set directly to the first member of the second planetary gear set;

a second interconnecting member continuously interconnecting the second member of the first planetary gear set directly to the third member of the second planetary gear set;

a third interconnecting member continuously interconnecting the second member of the second planetary gear set directly to the first member of the third planetary gear set;

a first torque transmitting mechanism selectively engageable to interconnect the third member of the third planetary gear set and the input member with the third member of the first planetary gear set;

a second torque transmitting mechanism selectively engageable to interconnect the second member of the first planetary gear set and the third member of the second planetary gear set with the third member of the third planetary gear set and the input member;

a third torque transmitting mechanism selectively engageable to interconnect the third member of the first planetary gear set with the second member of the third planetary gear set and the output member;

a fourth torque transmitting mechanism selectively engageable to interconnect the second member of the first planetary gear set and the third member of the second planetary gear set with the stationary member;

a fifth torque transmitting mechanism selectively engageable to interconnect the first member of the first planetary gear set and the first member of the second planetary gear set with the stationary member, and wherein the torque transmitting mechanisms are selectively engageable in combinations of at least two to establish at least six forward speed ratios and at least one reverse speed ratio between the input member and the output member.

11. The transmission of claim 10 wherein the first member of the first planetary gear set, the first member of the second planetary gear set and the third member of the third planetary gear set are sun gears, the second members of the first, second and third planetary gear sets are carrier members and the third member of the first planetary gear set, the third member of the second planetary gear set and the first member of the third planetary gear set are ring gears.

12. A transmission comprising:

an input member;

an output member;

first, second and third planetary gear sets each having sun gear, carrier and ring gear members, wherein the input member is continuously interconnected to the sun gear of the third planetary gear set and the output member is continuously interconnected to the carrier member of the third planetary gear set;

a first interconnecting member continuously interconnecting the sun gear of the first planetary gear set directly to the sun gear of the second planetary gear set;

a second interconnecting member continuously interconnecting the carrier member of the first planetary gear set directly to the ring gear of the second planetary gear set;

a third interconnecting member continuously interconnecting the carrier member of the second planetary gear set directly to the ring gear of the third planetary gear set;

a first torque transmitting mechanism selectively engageable to interconnect the sun gear of the third planetary gear set and the input member with the ring gear of the first planetary gear set;

a second torque transmitting mechanism selectively engageable to interconnect the carrier member of the first planetary gear set and the ring gear of the second planetary gear set with the sun gear of the third planetary gear set and the input member;

a third torque transmitting mechanism selectively engageable to interconnect the ring gear of the first planetary gear set with the carrier member of the third planetary gear set and the output member;

a fourth torque transmitting mechanism selectively engageable to interconnect the carrier member of the first planetary gear set and the ring gear of the second planetary gear set with the stationary member;

a fifth torque transmitting mechanism selectively engageable to interconnect the sun gear of the first planetary gear set and the sun gear of the second planetary gear set with the stationary member, and wherein the torque transmitting mechanisms are selectively engageable in combinations of at least two to establish at least six forward speed ratios and at least one reverse speed ratio between the input member and the output member.

* * * * *